Patented Nov. 25, 1930

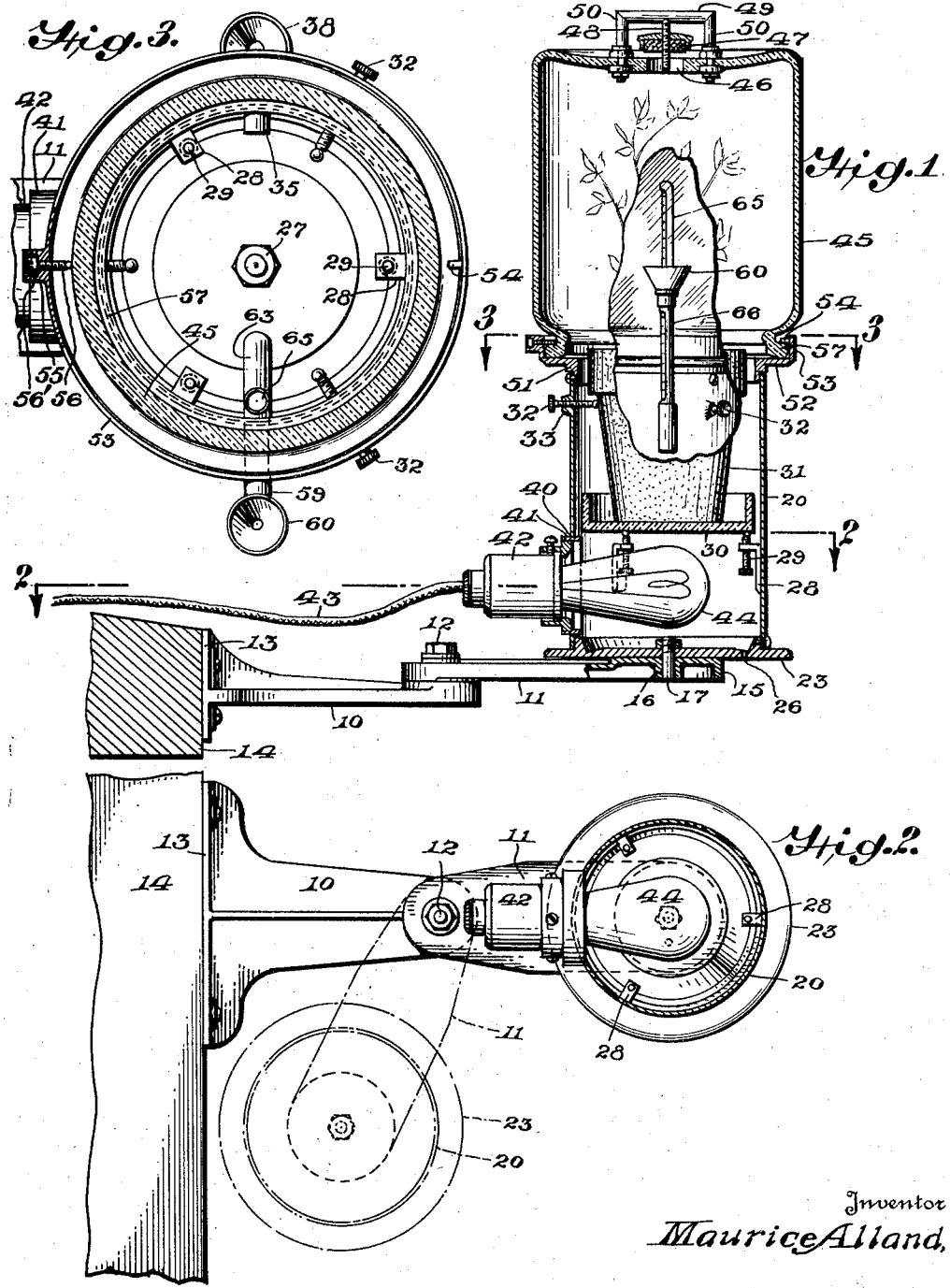

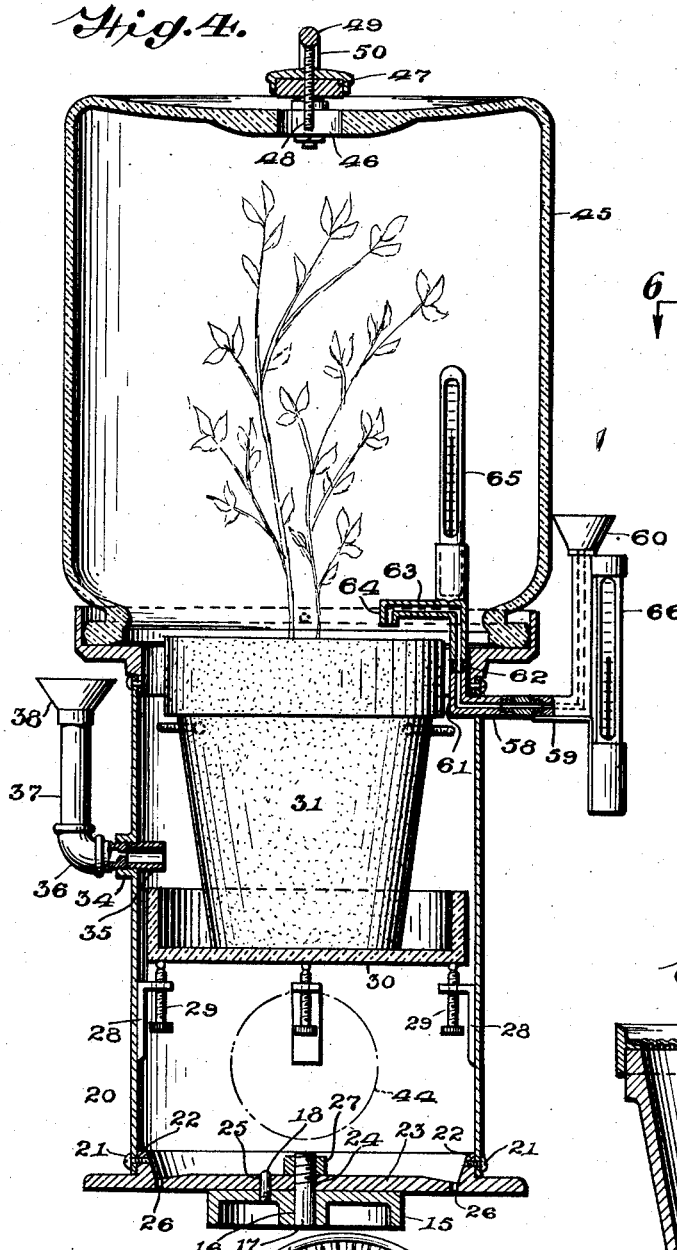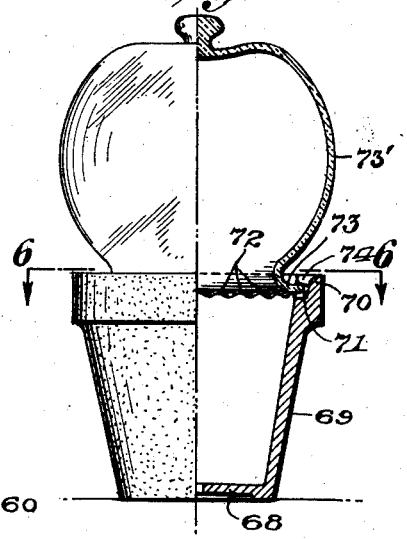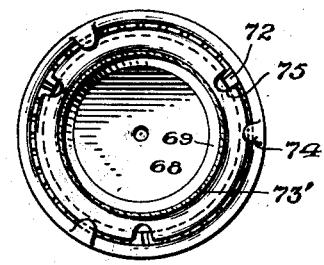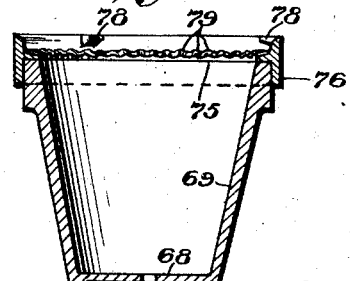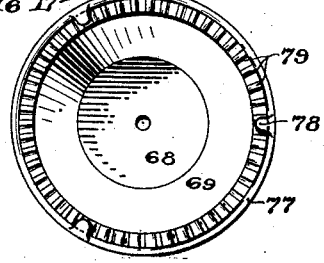

1,783,007

UNITED STATES PATENT OFFICE

MAURICE ALLAND, OF ATLANTIC CITY, NEW JERSEY

PLANT-PROPAGATING DEVICE

Application filed October 11, 1928. Serial No. 311,830.

The object of the invention is to provide improvements in devices for the germination of seed and propagation of plants, particularly when the temperature is relatively low as in the late fall, the winter, and early in the spring, and for use as a household article which can be supported upon the sill outside of a window or door, thru which the growth of the plant life can be watched.

Another object is to provide a device of this character which, while it can be made of any suitable size, has been found excellent as a container for a potted plant, so that after the plant attains sufficient size, or the outside atmosphere has reached a safe temperature, the plant with its pot or jardinière can be lifted therefrom as a unit.

A further object is to provide in such a device the combination of a pot, a glass or other light-admitting dome therefor adapted to surround and envelop the region above said pot and any plant extending therefrom, means to detachably connect said dome to said pot, and an arrangement whereby water may be placed in said pot for the consumption by, and to provide a humid atmosphere for, the plant, without removing the dome from the pot.

Still another object is to provide a unit casing comprising a pot-receiving section and a detachable transparent, or partially transparent, cover therefor adapted to receive a plant extending usually upwardly from a pot, means to detachably lock said cover to said pot section, means also within said pot section for supplying heat to the interior of said casing, and in the case of a lamp being used, to illuminate the interior of said casing and the plant after dark.

A still further object is to provide the dome of the device with an aperture and an adjustable closure therefor to permit air circulation and ventilation within said dome, the support for said closure comprising a handle by which the dome can be lifted as desired and transported from place to place, there being also provided a temperature-indicating instrument within said dome, and also a second such instrument upon the outside thereof for temperature comparisons when desired.

And still further objects consist in providing such improvements as a detachable and adjustable bracket by which the device can be supported in various positions with respect to a window or door frame, or the like; means to prevent the device from being removed from its bracket by unauthorized persons; adjustable means to adapt the device for pots of different heights; adjustable means to adapt the device for pots of different diameters; means to removably and interchangeably support a lamp, a glower heating element, or other device, for supplying warmth to the interior of the said casing; means to convey water from the outside of the device, thru a wall thereof and into a removable saucer, or into the adjustable pot-support which is preferably made hollow for such purpose; adjustable means to convey water from the outside of the device through a wall thereof and into the upper portion of the pot above the earth which surrounds and covers the roots of the plant; and to provide other details of construction and operation which will hereinafter appear, when reading the following description in conjunction with the accompanying drawings, in which Fig. 1 is a vertical diametrical section of one embodiment shown as being operatively supported upon the bracket above referred to; Fig. 2 is a horizontal section on the line 2—2 of Fig. 1; Fig. 3 is an enlarged fragmentary section on the line 3—3 of Fig. 1; Fig. 4 is an enlarged vertical diametrical section taken at right angles to the section represented by Fig. 1; Fig. 5 is a combined elevation and sectional view of a modified form of the device; Fig. 6 is a horizontal section on the line 6—6 of Fig. 5; Fig. 7 is a vertical diametrical section of a special form of plant pot upon which is positioned a detachable ring coupling for operatively supporting a removable glass or other dome; and Fig. 8 is a top plan view of the same.

Referring to Figs. 1 to 4 of the drawings, there is provided a bracket comprising fixed and oscillatable sections 10 and 11, pivotally connected together at 12 in any suitable manner, and said fixed section terminating in any suitably shaped bearing portion 13, adapted to be secured to the sill or other frame portion 14 of a door or window, or in fact to any desired supporting element. The outer free end portion of the oscillatable bracket section 11 is provided with a plane portion 15 thru which extends a bore 16, rigidly receiving a stud 17, the upper portion of which is preferably threaded or provided with other means for a purpose hereinafter described. Said plane portion is also provided with a unitary pin or lug 18, preferably spaced laterally from said stud and also having a purpose hereinafter described.

The plant propagating device proper comprises a normally lower casing section formed of preferably cylindrical walls 20, the lower edge portion of which is secured by screws or the like 21, to the upwardly extending flange 22 of a base member 23. This base member, when the bracket is not in use, serves as an immediate support for the device and may be of any desired shape, while it is provided with an axial bore 24 thru which extends the stud 17, and with a second bore or recess 25 into which extends the pin or lug 18, said base also being pierced by one or more combined drainage and air inlet apertures 26. When the plant propagating device as a unit is placed upon the outer bracket section, as shown in Fig. 4, and the nut 27 or other fastening means attached to the stud 17, it is obvious that the engagement of the base with the lug 18 prevents rotation of the base upon the bracket, and thereby prevents unauthorized persons from loosening the nut and making away with the device, since the upper portion is effectually closed as hereinafter described.

The inner surface of the cylindrical wall 20 is provided with lugs or brackets 28, thru which extend screws 29 for adjustably supporting a cup-shaped partition 30, the diameter of which is materially less than that of the surrounding cylindrical walls, so that air entering the apertures 26 can pass upwardly into the upper portion of the device. A plant, or so-called flower pot 31 is normally positioned upon the partition 30 and is spaced a uniform distance laterally from the walls 20 by means of screws 32, which extend radially thru said walls and thru bosses 33 carried thereby, said last-named screws being capable of co-operating with the conical wall of and supporting the pot 31 independently of said partition, if such for any reason is desired. The wall 20 is also provided with a port 34 thru which extends a nipple 35, connected at its outer end thru an L 36 with a tube 37, which extends upwardly and is provided with a conical or funnel-shaped member 38, all of which is so arranged that water may be poured into said conical member, whence it runs thru and from said nipple and into said cup-shaped partition, to provide water for the plant roots in the pot 31, and moisture for the plant extending upwardly therefrom.

The cylindrical wall 20 is also pierced by an aperture 40, in which is secured in any suitable manner a fixture 41, supporting a receptacle 42 into which lead electrical wires 43, for conveying current to a lamp or other form of heater element 44. When a lamp is used, its rays pass upwardly between the pot 31 and the surrounding wall 20 and the glow therefrom illuminates the plant in the upper portion of the device, especially when said plant is surrounded by a glass or other form of light-admitting dome or cover 45. Such a dome is provided with an air outlet aperture 46, which may be adjustably closed by means of a disc 47, rotatably mounted upon and in engagement with a threaded rod 48, which depends from the central portion of a transversely extending handle member 49, the opposite end portions of which are secured to and in spaced relation with the dome by means of arms 50. Thus, when the sun as during the winter fails to sufficiently warm the interior of said dome and the plant which it houses, energizing said heater element 44 serves the same purpose and also creates a highly desirable ventilation of the interior of the device by causing air entering the apertures 26 to become heated and flow upwardly past the pot and plant and thence thru the exit 46, this air of course being replaced by fresh air which constantly enters said inlet apertures.

To the upper portion of the wall 20 there is secured in any suitable manner a ring 51, having a radially outwardly extending plane flange 52 which terminates in an upwardly extending cylindrical flange 53. This last-named flange is provided with a fixed radially inwardly extending lug 54, while diametrically opposite thereto said flange is also provided with a boss 55 having a threaded bore and adapted to adjustably receive a pin 56, which has a head 56′ normally positioned well within an enlarged outer portion of said bore and is designed to be rotated only by means of a specially shaped key or wrench. When this adjustable pin is withdrawn, the flange 57 of the dome upon being tilted can be inserted beneath the fixed lug 54 and the dome lowered into normal position, after which replacement of the adjustable pin by means of the proper key or wrench serves to positively secure said dome upon said pot section. Also, it is obvious that with the dome thus secured in place, it is impossible to reach into the device, remove the pot, loosen the nut 27, and disengage the device from its supporting bracket. However, the owner can readily accomplish this series of operations whenever he desires.

In order to water the contents of the pot without removing the dome, there is provided a tube or conduit 58 which extends thru the cylindrical wall 20 and is provided upon its outer end with an upwardly extending tube 59 to which is affixed a conical element 60, while to the inner end portion of the tube 58 there is fixed an upwardly extending tube 61, which is connected thru a pivot coupling 62 with an inverted U-shaped tube 63, the downwardly directed free end 64 of which by virtue of said coupling is capable of being oscillated into and out of its water discharging position above the pot, so that the pot can be removed upwardly when desired. The inner tube 63 also forms a convenient support for a thermometer 65 and for a thermostat (not shown) which can be employed to control the heater element 44 and consequently maintain a uniform temperature in said dome. The outer tube 59 also forms a convenient support for a second thermometer 66, which at all times indicates the temperature of the atmosphere upon the outside of the dome, and provides a means for comparing the exterior and interior temperatures when such is desirable.

Referring now to Figs. 5 and 6, a plant pot is shown as comprising a bottom 68 and conical side walls 69, the latter terminating upwardly in a radially enlarged portion providing a cylindrical flange 70, surrounding an annular shoulder 71 which is provided with circumferentially spaced corrugations 72, upon which rests the flange 73 of an inverted "fish bowl" or the like 73', so that water may enter the pot without removing the bowl therefrom. The pot flange 70 is provided with radially inwardly extending lugs 74 which are adapted to pass thru cutout regions 75 in the flange 73 of said bowl, so that the bowl and pot may be united in a given relative position, after which they may be relatively turned so as to bring lugs and cutout regions out of alignment, and thus prevent accidental separation of the bowl or dome from the pot.

Referring to Figs. 7 and 8, the pot comprising bottom and sidewalls 68 and 69 terminates upwardly in an abrupt edge portion, upon which is adapted to rest the radially inwardly directed flange 75 of a ring, which is operatively positioned by means of a depending flange 76 which surrounds said edge portion. The ring is also provided with a cylindrical flange 77, which extends upwardly and is provided with radially inwardly directed lugs 78, which serve the same purpose as the lugs 74 shown in Figs. 5 and 6. Also, the upper surface of the flange 75 is provided with corrugations 79 for the passage of water as previously described. Thus, these two last-described forms of the device constitute a relatively inexpensive substitute for the more elaborate and much more efficient device first above described, but are well adapted for starting plants from seeds and especially from plant slips which require particular attention.

Having thus described my invention, what I claim and desire to protect by Letters Patent of the United States is:—

1. A plant-propagating device, comprising a hollow casing section adapted to contain a plant pot, a light-admitting dome removably carried by said section, said dome having a ventilating aperture, a handle on said dome, and adjustable means carried by said handle to vary the effective area of said aperture.

2. A plant-propagating device, comprising a hollow casing section adapted to contain a plant pot, an adjustable partition within said section to support a pot, and means to operatively support a heating element within said section beneath said partition.

3. A plant-propagating device, comprising a hollow casing section adapted to contain a plant pot, an adjustable partition within said section to support a pot, and means to operatively support a heating element within said section beneath said partition, a light-admitting dome removably carried by said section, and means to detachably lock said dome to said section.

4. A plant-propagating device, comprising a hollow casing section, a vertically adjustable cupped partition within said section to support a plant pot and to hold water, and radially adjustable means carried by said section and operative to laterally position and support a pot independently of said partition.

5. A plant-propagating device, comprising a hollow casing section, a vertically adjustable cupped partition within said section to support a plant pot and to hold water, radially adjustable means carried by said section and operative to laterally position and support a pot independently of said partition, and means to convey water from the outside of said section through a wall thereof and into said hollow partition.

6. A plant-propagating device, comprising a hollow casing section, a vertically adjustable cupped partition within said section to support a plant pot and to hold water, radially adjustable means carried by said section and operative to laterally position and support a pot independently of said partition, and means to convey water from the outside of said section through a wall thereof and into a pot therein, said means having an oscillatable terminal portion adapted to be shifted laterally out of the path of the pot when removing the latter from within said section 7. A plant-propagating device, comprising a hollow casing section, a vertically adjustable cupped partition within said section to support a plant pot and to hold water, radially adjustable means carried by said section and operative to laterally position and support a pot independently of said partition, and means to operatively support a heater element beneath said partition within said section.

8. A plant-propagating device, comprising a hollow casing section, a vertically adjustable cupped partition within said section to support a plant pot and to hold water, and radially adjustable means carried by said section and operative to laterally position and support a pot independently of said partition, the sides of said partition and a pot carried thereby being spaced from the walls of said section to permit a flow of air thereby.

9. A plant-propagating device, comprising a hollow casing section, a vertically adjustable cupped partition within said section to support a plant pot and to hold water, radially adjustable means carried by said section and operative to laterally position and support a pot independently of said partition, the bottom of said section having a combined drain and ventilating aperture, and means to operatively support a heater element in said section beneath said partition, and said partition and a pot thereon being spaced from the walls of said partition to permit said element to cause a flow of air to enter said bottom aperture and pass upwardly past the partition and a pot thereon.

10. A plant propagating device, comprising a hollow pot-containing section, a removable light-admitting cover carried thereby, means to lock said cover to said section, means to support said device having a stud and a lug, said section having an aperture to receive said stud and being normally in cooperation with said lug, and means normally carried by the inner end of said stud and accessible only from the interior of said section, to hold said section in engagement with said lug and prevent separation of said section from said supporting means.

11. A plant-propagating device, comprising a hollow casing section, a vertically adjustable pot-supporting partition within said section, means to adjustably position a pot diametrically of said section, a glass dome having an air exit aperture, means to vary the effective size of said aperture, means to lock said dome to said section, means to conduct water to a plant in a pot within the device while said dome is in operative position, means to support said device having a stud and a lug, said section having an aperture to receive said stud and being normally in cooperation with said lug, and means normally carried by the inner end of said stud and accessible only from the interior of said section, to hold said section in engagement with said lug and prevent the separation of said section from said supporting means.

12. A plant-propagating device, comprising a hollow casing section adapted to contain a plant pot, a light admitting dome removably carried by said section, said dome having a ventilating aperture, a handle on said dome, adjustable means carried by said handle to vary the effective area of said aperture, and means to removably lock said dome to said pot section.

13. A plant-propagating device, comprising a hollow casing section adapted to contain a plant pot, an adjustable partition within said section to support a pot, means to operatively support a heating element within said section beneath said partition, a light-admitting dome removably carried by said section, means to detachably lock said dome to said section, a conduit extending through a wall of said section, and a pivotally mounted inner terminal portion of said conduit operative to conduct water flowing through said conduit into a pot within said section, said terminal portion being oscillatable out of the path of said pot when removing the latter from within said section.

14. A plant-propagating device, comprising a hollow casing section, a vertically adjustable cupped partition within said section to support a plant pot and to hold water, radially adjustable means carried by said section and operative to laterally position and support a pot independently of said partition, means to convey water from the outside of said section through a wall thereof and into a pot therein, said means having an oscillatable terminal portion adapted to be shifted laterally out of the path of the pot when removing the latter from within said section, and means to convey water from the outside of said section through a wall thereof and into said hollow partition.

15. A plant-propagating device, comprising a hollow casing section, a vertically adjustable cupped partition within said section to support a plant pot and to hold water, radially adjustable means carried by said section and operative to laterally position and support a pot independently of said partition, the bottom of said section having a combined drain and ventilating aperture, means to operatively support a heater element in said section beneath said partition, and said partition and a pot thereon being spaced from the walls of said partition to permit said element to cause a flow of air to enter said bottom aperture and pass upwardly past the partition and a pot thereon, a dome carried by said section and having an air exit aperture, and adjustable means to vary the effective size of said exit aperture, to vary the flow of fresh air through said device.

In testimony whereof I have affixed my signature.

MAURICE ALLAND.